F. F. BRUSH.
RAILWAY SIGNALING APPARATUS.
APPLICATION FILED JULY 27, 1908.
939,974.
Patented Nov. 16, 1909.
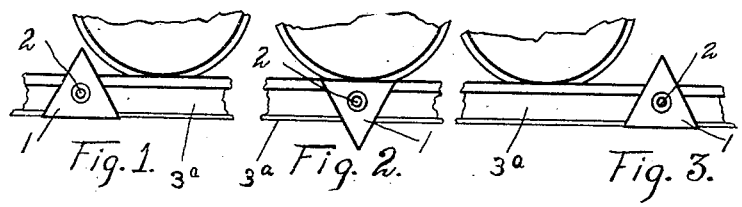
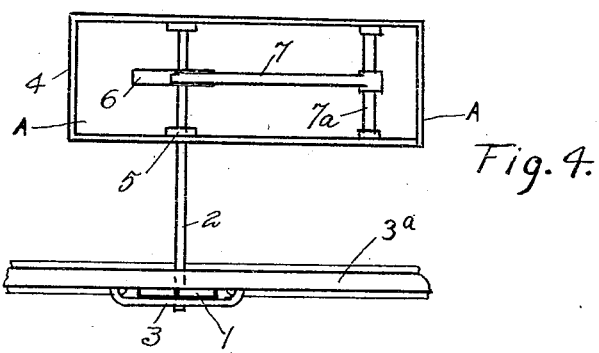
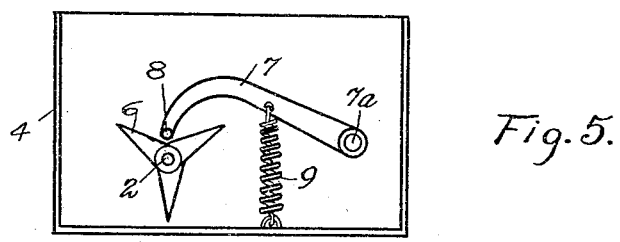
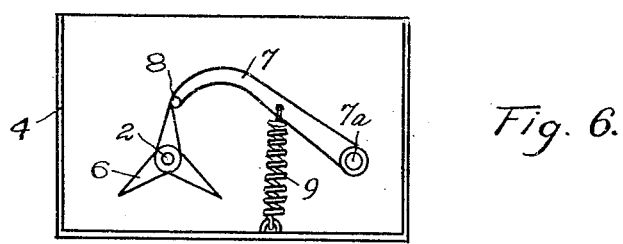
WITNESSES:
J. Ray Abbey
Ralph S. Warfield
INVENTOR
Frederick F. Brush
BY
Geo. B. Willcox. ATTORNEY

UNITED STATES PATENT OFFICE.

FREDERICK FARNSWORTH BRUSH, OF DETROIT, MICHIGAN.

RAILWAY SIGNALING APPARATUS.

939,974. Specification of Letters Patent. Patented Nov. 16, 1909.

Application filed July 27, 1908. Serial No. 445,672.

*To all whom it may concern:*

Be it known that I, FREDERICK F. BRUSH, citizen of the United States, residing at Detroit, in the county of Wayne and State of Michigan, have invented certain new and useful Improvements in Railway Signaling Apparatus; and I do hereby declare the following to be a full, clear, and exact description of the invention, such as will enable others skilled in the art to which it appertains to make and use the same.

This invention relates to railway signaling apparatus and pertains more particularly to block signal systems in which the wheels of a train are counted as they go into the block and are again counted as they go out of the block, it being usual in such systems to provide means by which suitable signals are operated to indicate whether all wheels that have entered the block have also passed out of it.

In the practical installation of systems of this type it is usual to count the wheels that enter and leave the block by means of mechanical devices of various forms all classed under the general term of "track instruments." These track instruments have been generally in the form of triggers, plungers, spring-actuated pistons and the like adapted to be engaged by the wheels of the passing train and to record by various means the number of wheels that have passed over them. A serious disadvantage in all such track instruments has been due to an inherent defect in their design. They usually employ some form of reciprocating motion, that is to say, the working member of the instrument is forced in one direction by contact with some part, as for instance, the wheel of a passing train while the return of the working part to its original position prior to receiving the next impulse is accomplished by means of a spring, weight or equivalent power medium attached to the working member. It is obvious that in a track instrument employing such a reciprocating motion, if any obstacle be forced into or lodged around the reciprocating member the further operation of the instrument will depend entirely upon its power to dislodge that obstacle and this power is naturally limited to the force exerted by the spring or weight. It has been found in practice that instruments designed on the reciprocating principle above described usually are devoid of power sufficient to operate satisfactorily when clogged with snow or ice, especially after the ice has been forced into the instrument under compression by the wheels of the train.

In my improved construction of track instrument I avoid the reciprocating principle as applied to the member that comes in contact with the wheel, and instead use a member that is revoluble—by which is meant that it is capable of being rotated step by step in one direction or in the opposite direction.

Another object of my invention is to provide a stronger and more compact instrument than heretofore.

A further object is the provision of a track instrument which can be operated by wheels of any size, as well as one wherein the instrument after being moved through a portion of its step will be further rotated in the same direction to complete its step immediately after the car wheel passes by the instrument.

A still further object is to provide a track instrument which is semi-locked when not engaged by the wheels of a passing train, to prevent its being tampered with.

One form of my invention is illustrated in the accompanying drawings, in which—

Figures 1, 2 and 3 are side views showing successive positions of the working member that is engaged by the car wheel. Fig. 4 is a top plan view of the apparatus. Fig. 5 is a vertical sectional view on the line A—A of Fig. 4; and Fig. 6 is a similar sectional view showing the parts in the position they occupy just after the wheel has passed over the working member and before the parts have assumed their normal position.

In my present invention I construct the track instrument to operate on the revolving rather than the reciprocating principle. The general requirements of a revolving track instrument are set forth in my pending application, Serial No. 390,169, filed August 26, 1907.

The working member operated by the wheels of the train consists preferably of a heavy triangular metallic plate 1, having straight or slightly concave edges. This plate is supported on a heavy shaft 2, mounted in a heavy bearing 3, bolted to the rail 3ª.

It is obvious that track plates of other designs than triangular might be employed, and while for the purpose of this description I have shown the member 1, as having three projections, it is obvious than an instrument having more than three projections might be employed without departing from the spirit of my invention.

The shaft 2 passes through the rail and into a water-proof receptacle 4, through a stuffing-box 5. The receptacle 4, will contain the electric commutator contacts described in my pending application above referred to, but the contacts are omitted from the present drawing, for the sake of clearness. Fixed to the shaft 2, within the receptacle is a heavy star wheel 6, engaged by a heavy pawl 7, pivotally supported at one end on a shaft 7ª, the free end of the pawl being provided with a roller bearing or other anti-friction means 8, engaging the star wheel.

A heavy tension spring 9 is fastened at one end to the pawl 7, and at the other end to the receptacle 4.

Referring now to the triangular plate 1. It is obvious that the car wheel can only turn the plate through an angle of about sixty degrees more or less to move it from the position shown in Fig. 2, but in order that the plate be again rotated to count the next wheel, it is necessary that the plate be turned through an additional arc of substantially sixty degrees, in order to bring it to the position shown in Fig. 3, making the total angle through which the plate must turn in order to count one wheel and get into position to count the next, approximately one-hundred and twenty degrees. It is to impart this additional automatic movement that the star wheel 6, pawl 7, and spring 9 are employed.

The track plate 1, normally occupies the position shown in Fig. 1, the star wheel and pawl occupying the positions shown in Fig. 5. As the car wheel moves the plate 1 in either direction through an arc of say, sixty degrees from the position shown in Fig. 1 to the position shown in Fig. 2, the shaft 2 and star wheel 6 are partially rotated. This partial rotation operates to bring one or the other of the inclined edges of the spurs adjacent the free end of the pawl into engagement with the pawl to raise the pawl to the position shown in Fig. 6. The pawl is elevated on the star wheel 6 and when the end of the pawl arrives in the bottom groove of the star wheel, as indicated in Fig. 5, the plate 1 will have been moved through an arc of say one-hundred twenty degrees.

While I have shown and described a single star wheel 6 and a single pawl 7, it is obvious that more than one pawl and star wheel may be employed if desired.

The tension of spring 9 is in practice so heavy as to make it practically impossible to turn the track instrument except by the wheels of a passing car, thereby preventing tampering with the machine.

The box 4, is made of strong material, as for instance, cast iron, and is preferably filled with oil to a sufficient depth to immerse the star wheel.

It is obvious that the first move of a car wheel will be sufficient to loosen any ice that may have accumulated around the plate 1, and that once loosened and moved through its first arc of sixty degrees the pawl 7, inclosed in the box will be able by means of the spring 9 to turn the star wheel through the remaining sixty degrees.

To prevent ice forming to any great extent on the plate 1, I may also partially submerge the plate 1 in a suitable cup or pocket containing an oil bath. The pocket is omitted from the drawings for the sake of clearness.

Having thus fully disclosed my invention, what I claim as new is:—

1. A step by step actuated track instrument comprising a polyangular member adapted to be engaged and partially rotated by a car wheel in passing, the car wheel actuating the member in one direction through a partial step, and means for imparting a further rotary movement in the same direction to the member subsequent to the engagement of the car wheel therewith to complete the step.

2. A step by step actuated track instrument comprising a polyangular member adapted to be engaged by a car wheel in passing, the car wheel actuating the member through a partial step movement, a suitably journaled shaft to which the member is secured, a star wheel on the shaft, and means engaging the star wheel for imparting a further rotary movement to the member subsequent to the engagement of the car wheel therewith and in the same direction of travel to complete the step.

3. A step by step actuated track instrument comprising a polyangular member adapted to be engaged and partially rotated by a car wheel in passing, a suitably journaled shaft to which the member is secured, a star wheel on the shaft and a spring actuated pawl engaging the star wheel to actuate the member through the remainder of its step immediately subsequent to the engagement of the car wheel and member, and releasably hold the member in locked position at the completion of the step.

4. A track instrument comprising a polyangular member adapted to be engaged by a car wheel in passing, a shaft to which the member is secured, a star wheel on the shaft and means for retaining the star wheel and rotating member in semi-locked position.

5. A track instrument comprising a polyangular member adapted to be engaged by a car wheel in passing, a shaft to which the member is secured, a star wheel on the shaft and a pawl yieldingly engaging the star wheel.

6. A track instrument comprising a polyangular member adapted to be engaged by a car wheel in passing, a shaft to which the member is secured, a star wheel on the shaft, a pawl, the free end of which engages the star wheel and a tension spring engaging the pawl to cause its free end to bear strongly against the star wheel.

7. A track instrument comprising a triangular member adapted to be engaged by a car wheel in passing, a suitably journaled shaft to which the member is fixed, a star wheel on the shaft, a pawl pivotally supported at one end, and an antifriction bearing on the free end of the pawl adapted to engage the star wheel.

8. A track instrument comprising a triangular member adapted to be engaged by a car wheel in passing, a shaft suitably journaled to which the member is fixed, a star wheel on the shaft, a pawl pivotally supported at one end, an antifriction bearing on the free end of the pawl adapted to engage the star wheel, and a spring engaging the pawl.

9. A track instrument comprising a polyangular member adapted to be engaged by a car wheel in passing, a water proof receptacle, a shaft, one end of which extends into the receptacle, the member being fixed to the shaft exteriorly of the receptacle, a star wheel on that portion of the shaft within the receptacle, and a pawl pivotally supported within the receptacle and adapted to yieldingly engage the star wheel.

10. In a signal system, a track instrument comprising a revoluble member having a plurality of projections, each adapted to be engaged by a car wheel in passing, and contact making and breaking mechanism actuated by the revoluble member.

11. In a signal system, a track instrument comprising a revoluble member having a plurality of projections, each adapted to be engaged by a car wheel in passing, and a commutator actuated by the revoluble member.

In testimony whereof, I affix my signature in presence of two witnesses.

FREDERICK FARNSWORTH BRUSH.

Witnesses:
  CHAS. R. AMMERMAN,
  MARGARET ZANGER.